Patented Feb. 9, 1943

2,310,889

UNITED STATES PATENT OFFICE 2,310,889

VINYL RESIN COMPOSITION AND ARTICLES OF MANUFACTURE COMPRISING SAME

Leonard Becker, Chicago, Ill., assignor to S. Buchsbaum and Company, Chicago, Ill., a corporation of Illinois No Drawing. Application January 24, 1941, Serial No. 375,770

8 Claims. (Cl. 260—43)

The invention relates to vinyl resin compositions and articles of manufacture comprising same. It includes liquid vinyl resin coating compositions and also the composition after the liquid has been evaporated. The liquid composition which constitutes a preferred embodiment of the invention may be used to make gloves or the like by coating on a mold or form, evaporating the volatile solvent therefrom and stripping from the mold. Sheets or films suitable for manufacture into raincoats also may be made by a coating or casting procedure, using the preferred type of vinyl resin liquid coating composition.

In accordance with one embodiment of the invention, a vinyl resin which is a co-polymer of vinyl chloride and vinyl acetate is dissolved in a volatile solvent and then an acrylate resin and a plasticizer added to the solution of the vinyl resin. To this solution is then added a solution of a phenolic resin in a solvent which is a solvent for both the phenolic resin and the vinyl resin.

The vinyl resins which I prefer to use are made by conjointly polymerizing two or more vinyl derivatives, of which vinyl halides, particularly the chlorides, vinyl esters of aliphatic acids such as vinyl acetate, propionate, and butyrate, and vinyl benzene or styrene, are illustrative. Particularly desirable vinyl resins are those resulting from the conjoint polymerization of vinyl chloride and vinyl acetate in the proportions of about 70 to 93 parts of vinyl chloride with about 30 to 7 parts of vinyl acetate. A suitable vinyl resin is sold by the Carbide and Carbon Chemicals Corporation under the trade name of "Vinylite," and is a co-polymer of vinyl chloride and vinyl acetate which is soluble in acetone and contains about 85% of vinyl chloride in the conjoint polymer.

Any of the many solvents adapted to dissolve vinyl resins may be used. Examples of suitable solvents are: ketones, such as acetone; methyl ethyl ketone; dipropyl ketone; cyclohexone and methyl butyl ketone; cyclic dialkylene dioxides, such as 1-4 dioxane and dimethyl dioxane; esters such as ethyl acetate and butyl acetate; halogenated hydrocarbons such as chlorbenzene, ethylene and propylene dichlorides, or dibromides and acetylene tetrachlorides; and aromatic hydrocarbons such as toluene and xylene.

A plasticizer or mixture of plasticizer should be used which has a softening or plasticizing effect on the vinyl resin and preferably also on the acrylate and phenolic resins. Examples of suitable plasticizers are dibutyl phthalate and di (ethylene glycol monobutyl ether) phthalate. A mixture of dibutyl phthalate and dibutoxy ethyl phthalate has been found highly satisfactory.

The acrylate resin is used in the composition to give increased stretch and coherence to the composition after the solvent has been evaporated. In general, resins which are polymers of acrylic acid or acrylic acid esters may be used. A suitable acrylate resin is the methyl methacrylate resin known as Acryloid sold by Resinous Products and Chemical Co., Inc.

The phenolic resin is used to give greater heat resistance to the composition. Suitable phenolic resins are the phenol aldehyde resins which have not been reacted to such an extent that they are insoluble in solvents for vinyl resins. The preferred phenolic resin is a phenol aldehyde resin which is fusible and soluble in acetone. The more completely reacted phenol aldehyde resins which soften but do not melt on heating and which are soluble in cyclohexanol are also satisfactory.

Other ingredients may be incorporated in the composition in small amounts. For example, minor amounts of natural or butadiene rubber may be milled into the vinyl resin and this composition dissolved with the acrylate and phenolic resins. The addition of rubber gives increased tensile strength to the composition. The proportions of the ingredients may be varied widely, depending upon the use to be made of the composition.

In making gloves, raincoats and the like, the vinyl resin is used in major amount compared with either the acrylate resin or the Bakelite resin. A suitable range of vinylite resins on the basis of the total resins is from 60 to 90 percent by weight, and the preferred range is from 60 to 70 percent. The acrylate resin may suitably vary from 5 to 35 percent by weight, preferably from 25 to 35 percent, and the phenolic resin may vary from 1 to 10 percent by weight, preferably from 5 to 8 percent. One satisfactory formula is vinyl resin 62.5%, acrylic resin 29.5%, and phenolic resin 8% by weight.

The plasticizers are used in minor amounts compared with the resin; and for gloves, raincoats and the like, the only requirements are that they are used in sufficient amount to have a substantial plasticizing effect but not in such amount that they produce a tacky composition after the volatile solvent has been evaporated.

In the liquid composition, the solvent may be varied widely. In making gloves and the like, the amount of solvent should be so that the composition has sufficient viscosity and body for the dipping operation.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

The following composition was used for dipping molds for the manufacture of gloves:

80 oz. of a solution of 1 lb. Vinylite resin in 1 gal. acetone;
25 oz. of acryloid resin;
90 c.c. of Kronisol (dibutoxy ethyl phthalate);
35 c.c. of dibutyl phthalate;
188 c.c. of a solution of 4 oz. Bakelite XR-3180 resin to 1 pt. acetone.

The glove forms were dipped into the above solution, withdrawn, the solvent evaporated, and the resulting glove stripped from the form. The glove was clear and of homogeneous composition.

*Example II*

A suitable composition for making raincoats is as follows:

80 oz. of a solution of 1# Vinylite resin and 1 gal. acetone
25 oz. of acryloid (an acrylate resin)
90 c.c. of dibutyl sebacate
35 c.c. of dibutyl phthalate
188 c.c. of a solution of 4 oz. Bakelite XR-3180 to 1 pint acetone In the above formulae, the term Vinylite is a trade name for an acetone soluble co-polymer of vinyl chloride and vinyl acetate sold by the Carbide and Carbon Corporation at the filing date of this application. The term Acryloid is a trade name for a methyl methacrylate resin sold by Resinous Products and Chemical Co., Inc. at the filing date of this application. The term Bakelite XR-3180 is a trade name for an acetone soluble phenol aldehyde resin of the resol type sold by Bakelite Corporation at the filing date of this application.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A composition particularly adapted for use in the manufacture of raincoats, gloves and the like, said composition comprising a vinyl resin which is a co-polymer of vinyl chloride and vinyl acetate, a thermosetting phenolaldehyde resin, methyl methacrylate resin and a plasticizer, the vinyl resin being present in from 60 to 90% by weight of the total resins, the phenol-aldehyde resin being present in from 1 to 10% of the total resins and the methyl methacrylate resin being present in from 5 to 35% by weight of the total resins.

2. A composition particularly adapted for use in the manufacture of raincoats, gloves and the like, said composition comprising a vinyl resin which is a copolymer of vinyl chloride and vinyl acetate, a thermosetting phenol-aldehyde resin, methyl methacrylate resin and a plasticizer, the vinyl resin being present in from 60 to 70% by weight of the total resins, the phenol-aldehyde resin being present in from 5 to 8% by weight of the total resins, and the methyl methacrylate resin being present in from 30 to 35% by weight of the total resins.

3. A liquid coating composition comprising a vinyl resin which is a co-polymer of vinyl chloride and vinyl acetate, a volatile solvent for the vinyl resin, a methyl methacrylate resin which is soluble in said volatile solvent, a thermosetting phenol-aldehyde resin which is soluble in said volatile solvent, and a high boiling liquid plasticizer which is at least a latent solvent for the vinyl resin, phenol-aldehyde resin and methyl methacrylate resin, said vinyl resin being present in from 60 to 90% by weight of the total resins, the phenol-aldehyde resin being present in from 1 to 10% of the total resins, and the methyl methacrylate resin being present in from 5 to 35% by weight of the total resins.

4. A liquid coating composition comprising a vinyl resin which is a co-polymer of vinyl chloride and vinyl acetate, a volatile solvent for the vinyl resin, a methyl methacrylate resin which is soluble in said volatile solvent, a thermosetting phenol-aldehyde resin which is soluble in said volatile solvent, and a high boiling liquid plasticizer which is at least a latent solvent for the vinyl resin, phenol-aldehyde resin and methyl methacrylate resin, said vinyl resin being present in from 60 to 70% by weight of the total resins, the phenol-aldehyde resin being present in from 5 to 8% by weight of the total resins, and the methyl methacrylate resin being present in from 30 to 35% by weight of the total resins.

5. Sheet material suitable for gloves, raincoats and the like, comprising a vinyl resin which is a co-polymer of vinyl chloride and vinyl acetate, a thermosetting phenol-aldehyde resin, methyl methacrylate resin and a plasticizer, said vinyl resin being present in from 60 to 90% by weight of the total resins, the phenol-aldehyde resin being present in from 1 to 10% of the total resins, and the methyl methacrylate resin being present in from 5 to 35% by weight of the total resins.

6. A glove made of a composition comprising a vinyl resin which is a co-polymer of vinyl chloride and vinyl acetate, a thermosetting phenol-aldehyde resin, methyl methacrylate resin and a plasticizer in sufficient amount to give flexibility without tackiness, said vinyl resin being present in from 60 to 70% by weight of the total resins, the phenol-aldehyde resin being present in from 5 to 8% by weight of the total resins, and the methyl methacrylate resin being present in from 30 to 35% by weight of the total resins.

7. A raincoat made of a composition comprising a vinyl resin which is a co-polymer of vinyl chloride and vinyl acetate, a thermosetting phenol-aldehyde resin, methyl methacrylate resin and a plasticizer in sufficient amount to give flexibility without tackiness, said vinyl resin being present in from 60 to 70% by weight of the total resins, the phenol-aldehyde resin being present in from 5 to 8% by weight of the total resins, and the methyl methacrylate resin being present in from 30 to 35% by weight of the total resins.

8. A composition particularly adapted for use in the manufacture of raincoats, gloves and the like, said composition comprising a copolymer of a vinyl halide and a vinyl ester of a lower aliphatic fatty acid, a thermosetting phenol-aldehyde resin, methyl methacrylate resin and a plasticizer, the vinyl resin being present in from 60 to 90% by weight of the total resins, the phenol-aldehyde resin being present in from 1 to 10% of the total resins and the methyl methacrylate resin being present in from 5 to 35% by weight of the total resins.

LEONARD BECKER